(No Model.)  2 Sheets—Sheet 1.

H. C. WITTROCK.
CULTIVATOR ATTACHMENT.

No. 553,324.  Patented Jan. 21, 1896.

Inventor
Henry C. Wittrock.

Witnesses

By his Attorneys,
C. A. Snow & Co.

(No Model.) 2 Sheets—Sheet 2.

H. C. WITTROCK.
CULTIVATOR ATTACHMENT.

No. 553,324. Patented Jan. 21, 1896.

Inventor
Henry C. Wittrock.

Witnesses

By his Attorneys.

UNITED STATES PATENT OFFICE.

HENRY C. WITTROCK, OF FALLS CITY, NEBRASKA, ASSIGNOR OF ONE-HALF TO FREDERICK W. WITTROCK, OF SAME PLACE.

CULTIVATOR ATTACHMENT.

SPECIFICATION forming part of Letters Patent No. 553,324, dated January 21, 1896.

Application filed October 20, 1894. Serial No. 526,490. (No model.)

*To all whom it may concern:*

Be it known that I, HENRY C. WITTROCK, a citizen of the United States, residing at Falls City, in the county of Richardson and State of Nebraska, have invented a new and useful Cultivator Attachment, of which the following is a specification.

My invention relates to an attachment for straddle-row disk cultivators, the objects in view being to provide a device adapted for hilling listed corn and cultivating the soil adjacent to the roots thereof, the soil being thrown inward toward the row and around the roots of the corn.

Further objects and advantages of the invention will appear in the following description, and the novel features thereof will be particularly pointed out in the appended claims.

Figure 1:
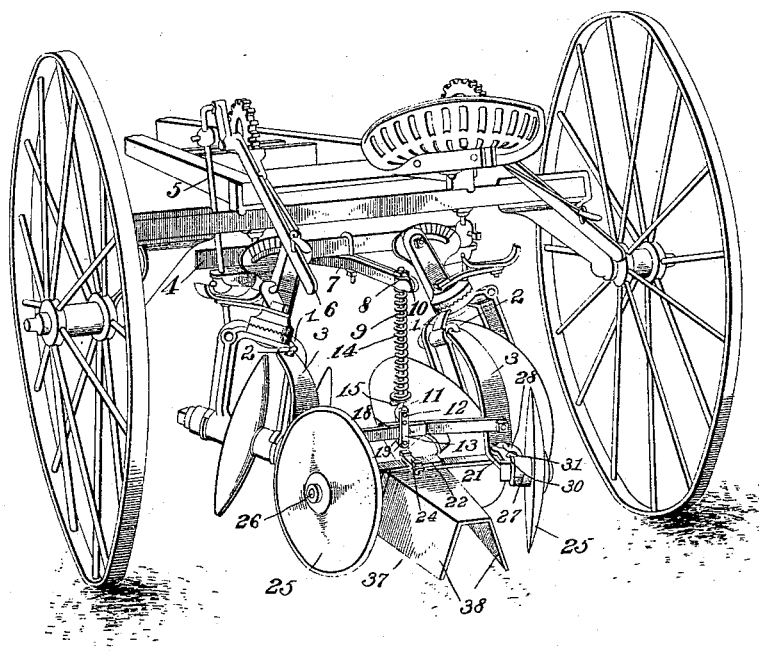
Figure 2:
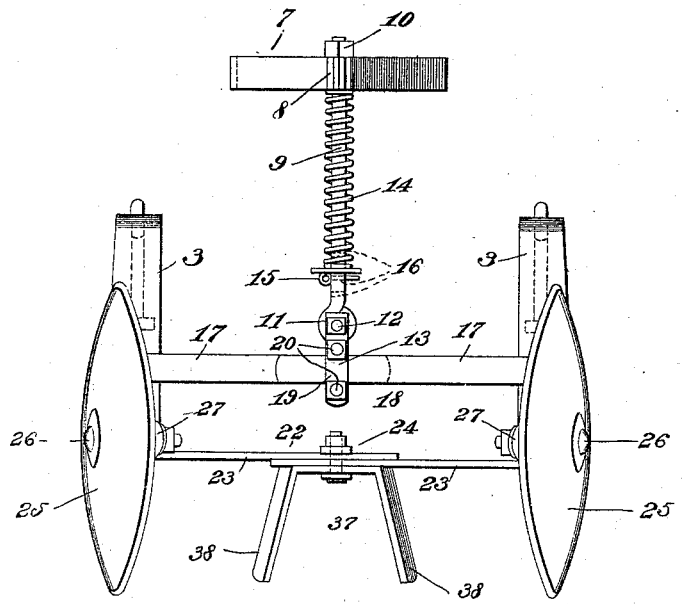
Figures 3, 4:
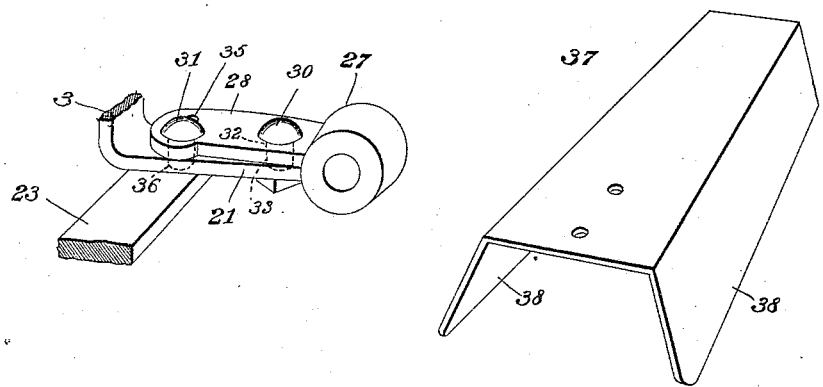

In the drawings, Figure 1 is a perspective view of a device embodying my invention applied in the operative position to a disk cultivator. Fig. 2 is a detail view, in perspective, of the attachment. Fig. 3 is a similar view of one of the adjustable bearing-boxes for the disks. Fig. 4 is a similar view of the shoe.

Similar numerals of reference designate corresponding parts in all the figures of the drawings.

1 represents a standard of the disk cultivator, to which are attached the eyebolts 2 for the attachment of the front ends of the curved arms 3, forming parts of the improved attachment.

4 represents a bar forming a part of the disk cultivator and connected, by means of a rod 5, with a hand-lever 6, said bar being the means whereby the disks of the cultivator are elevated, and extending rearward from said bar 4 is a yoke 7, provided at its rear end with an eye 8, which is fitted loosely upon the upper end of a stem 9. This stem is threaded at its upper extremity to engage the nut 10, which bears upon the upper edge of the said yoke, and the stem terminates at its lower end in an eye 11, which receives a pin or bolt 12, arranged in the clamp 13. Coiled upon said stem and bearing at its upper end against the under side of said yoke is a spring 14, a key 15 being engaged with one of a series of perforations 16 in the stem to receive the pressure of the lower end of the spring.

Bolted at their outer extremities to the curved supporting-arms 3 are the sections 17 of an extensible brace-bar 18, and the inner overlapping ends of said sections are secured at the desired adjustment to hold the supporting-arms at the preferred interval by means of said clamp 13. Said clamp consists of opposite parallel plates 19, which are connected above and below the brace-bar by bolts 20. Said supporting-arms are provided with horizontal portions 21, which are connected by an extensible brace-bar 22, which corresponds in construction with the bar above described, the same consisting of the relatively adjustable sections 23, having overlapping inner extremities which are secured at the desired adjustment by means of a clamp 24.

The concavo-convex disks 25 are provided with spindles 26, mounted in bearings 27, and these bearings are provided with extensions or ears 28, which rest upon the horizontal portions of the supporting-arms, and are secured thereto by means of bolts 30 and 31. The front bolts 30 extend through registering perforations 32 and 33 in the ears or extensions and in the horizontal portions of the supporting-arms, and the rear bolts 31 extend through transversely-elongated openings or slots 35 in the rear ends of said extensions or ears and perforations 36 in the horizontal portions of the supporting-arms. These bolts 31 also serve to secure the extremities of the extensible brace-bar 22 to the supporting-arms. Arranged between the planes of the said disks is a rearwardly-tapered shoe 37, having the downwardly-divergent sides or cheeks 38, which converge toward the rear end of the shoe, and which are rounded at their front extremities. This shoe is secured to the extensible brace-bar 22, by means of the clamp 24, and it is adapted to shield the small cornplants from being covered by the soil which the disks throw toward the row.

The upper edges of the cheeks are connected by an imperforate horizontal plate to prevent clods of earth from falling between the cheeks upon the plants. The rearwardly-convergent sides or cheeks of the shoe provide for crowding the soil inwardly or toward the row of plants as the shoe advances along the row, thereby slightly packing the soil close to the plants before loose soil thrown by the disks comes in contact therewith, and the downwardly and outwardly inclined construction of the sides or cheeks, while protecting the plants from injury by the earth thrown inward from the disks, holds the earth in such position as to drop it gently upon opposite sides of the row of plants as the shoe is drawn from beneath. This dropping of the earth upon opposite sides of the row of plants occurs after the disks have passed such plants, and hence the earth falls but a short distance and in effect slowly settles around and sifts between the plants without injuring or bending them out of their proper positions.

The means above described for adjusting the disks provides for the arrangement thereof at any desired angles, and the extensible brace-bars provide for disposing said disks at the desired interval. By means of the yoke above described downward pressure may be communicated through the coiled spring to the attachment, and the adjustment afforded by the key and the series of perforations in the stem, and by the nut which is threaded upon the upper extremity of said stem, provides for the desired relative arrangement of the parts.

It will be understood that in practice various changes in the form, proportion and the minor details of construction may be resorted to without departing from the principle or sacrificing any of the advantages of this invention.

Having described the invention, what is claimed, and desired to be secured by Letters Patent, is—

1. The combination with a framework, of arms loosely connected at their front ends to the framework and arranged, respectively, upon opposite sides of the center of the same, a brace bar connecting said arms near their rear ends and extending transversely therebetween, disks mounted in bearings at the rear ends of the arms, and a hilling shoe arranged longitudinally between the planes of the disks and secured to and supported by said transverse brace bar, substantially as specified.

2. The combination with a framework, of arms loosely connected at their front ends to the framework, an extensible brace bar connecting said arms near their rear ends and disposed transversely therebetween, said brace bar having relatively adjustable members, disks mounted at the rear ends of the arms, and a hilling shoe arranged longitudinally between the planes of the disks and secured to the transverse brace bar by means which provide for the arrangement of the shoe midway between the disks, substantially as specified.

3. The combination with a framework, of arms loosely connected at their front ends to the framework, an extensible brace bar connecting said arms near their rear ends and disposed transversely therebetween, said brace bar having relatively adjustable members which overlap at their inner ends, disks mounted upon the rear ends of the arms, a hilling shoe arranged longitudinally between the planes of the disks, and a clamp for securing the members of the brace bar at the desired extension and attached to the shoe to secure the latter in the desired position to the brace bar, substantially as specified.

4. The combination with a framework, of supporting arms loosely connected at their front ends to the framework, an extensible bar connecting said arms near their rear ends and having relatively adjustable members overlapping at their inner extremities, disks mounted upon the rear ends of the arms, a hilling shoe arranged between the planes of the disks, and a clamp including bolts engaging perforations in the closed upper side of the shoe and extending, respectively, in front and in rear of the overlapping extremities of the members of the brace bar, a plate engaged by said bolts and bearing upon the opposite side of the overlapping extremities, and nuts threaded upon the bolts, whereby the extensible members are locked at the desired adjustment and the hilling shoe is secured to the brace bar, substantially as specified.

5. The combination with a framework, of supporting arms loosely connected at their front ends to the framework, transverse extensible brace bars connecting said arms near their rear ends, a hilling shoe arranged beneath and secured to an intermediate part of the lower brace bar, disks mounted upon the rear ends of the arms upon opposite sides of the hilling shoe, and means connected to the upper brace bar for depressing the rear ends of the arms and causing the desired penetration of the disks, said means including a guide-rod or a stem connected at its lower end to the upper brace bar and fitted at its upper end in an eye, a spring coiled upon said stem, and means for adjusting the tension of the spring, substantially as specified.

6. The combination with a supporting framework having a movable frame, and means for moving said frame, of arms loosely connected at their front ends to a member of the movable frame, a yoke secured to a member of said movable frame and provided at its rear end with an eye, disks mounted in bearings at the rear ends of said arms, a hilling shoe arranged between said disks, a brace bar connecting the said arms, a stem loosely connected with said brace bar and fitting in the eye at the rear end of the yoke, a nut threaded upon the upper extremity of the stem, a spring coiled upon the stem below the eye, and a key adapted to fit in one of a series of perforations near the lower end of the stem, substantially as specified.

7. The combination with a framework, of arms loosely connected at their front ends to the framework, disks mounted upon the rear ends of said arms, transverse extensible brace bars connecting the arms near their rear ends and arranged in upper and lower planes, said brace bars each comprising relatively adjustable members overlapping at their inner extremities, a hilling shoe, a clamp for securing the members of the lower brace bar at the desired adjustment and also securing the hilling shoe in place upon said brace bar, a clamp engaging the overlapping extremities of the members of the upper brace bar, and means for depressing the rear ends of the arms, said means including a stem connected at its lower end to the clamp by which the members of the upper brace bar are secured and fitting at its upper end in an eye, a spring coiled upon said stem to exert downward pressure, and means for adjusting the tension of the spring to vary the downward pressure, substantially as specified.

8. The combination with a framework, of arms loosely connected at their front ends to the framework, bearings having ears pivotally mounted on the rear ends of said arms and provided with segmental slots, bolts for engaging said slots and perforations in the arms to lock the bearings at the desired angular adjustment, an extensible brace bar arranged transversely between the rear ends of the arms and having relatively adjustable members overlapping at their inner extremities, the outer extremities of the members being secured to the arms by the bolts which engage the segmental slots in the ears of the bearings, means for securing the members of the brace bar at the desired extension, and disks having their spindles mounted in said bearings, substantially as specified.

In testimony that I claim the foregoing as my own I have hereto affixed my signature in the presence of two witnesses.

HENRY C. WITTROCK.

Witnesses:
H. B. McNULTY,
J. R. WILLUTE.